United States Patent [19]

Booher

[11] Patent Number: 4,550,947
[45] Date of Patent: Nov. 5, 1985

[54] MOVABLE REAR CROSS BAR

[76] Inventor: Howard Booher, P.O. Box 277, Randolph, Ohio 44265

[21] Appl. No.: 591,931

[22] Filed: Mar. 21, 1984

[51] Int. Cl.⁴ .......................................... B62D 25/00
[52] U.S. Cl. ................................................ 296/181
[58] Field of Search ................... 296/181, 183, 184; 414/517

[56] References Cited

U.S. PATENT DOCUMENTS

| 3,155,419 | 11/1964 | Garson et al. | 296/181 |
| 3,195,944 | 7/1965 | Simmons | 296/183 |
| 4,044,899 | 8/1977 | Booher | 414/517 |
| 4,071,153 | 1/1978 | Booher | 414/517 |
| 4,302,044 | 11/1981 | Sims | 296/183 |

Primary Examiner—Robert R. Song
Attorney, Agent, or Firm—Harpman & Harpman

[57] ABSTRACT

A movable rear cross bar for use on a horizontal rear discharge trailer. The movable rear cross bar is pivotally secured to the upper rear corners of the trailer side walls providing temporary additional clearance for oversized material being discharged from the trailer.

4 Claims, 4 Drawing Figures

MOVABLE REAR CROSS BAR

BACKGROUND OF THE INVENTION

1. Technical Field

This device relates to rear cross bars on horizontal rear discharge trailers that maintain the vertical and horizontal alignment of the trailer side walls under stress during rear unloading.

2. Description of the Prior Art

Prior art devices of this type have consisted of a horizontally disposed cross bar affixed to the end upper corners of the side walls of the trailer. Horizontal rear discharge trailers can be seen in U.S. Pat. Nos. 4,071,153 and 4,044,899.

Applicant knows of no relevant prior art that discloses a movable rear cross bar which is utilized in horizontally disposed discharge trailers of the type presently in use.

SUMMARY OF THE INVENTION

A movable rear cross bar pivotally secured to the end upper corners of a horizontal rear discharge trailer. The rear cross bar pivots upwardly to a near vertical position when engaged by expanding load material under the advancement of a ram within the trailer providing additional load clearance and returning to a horizontal position after the material has passed.

DESCRIPTION OF THE PREFERRED EMBODIMENT

Figure 1:
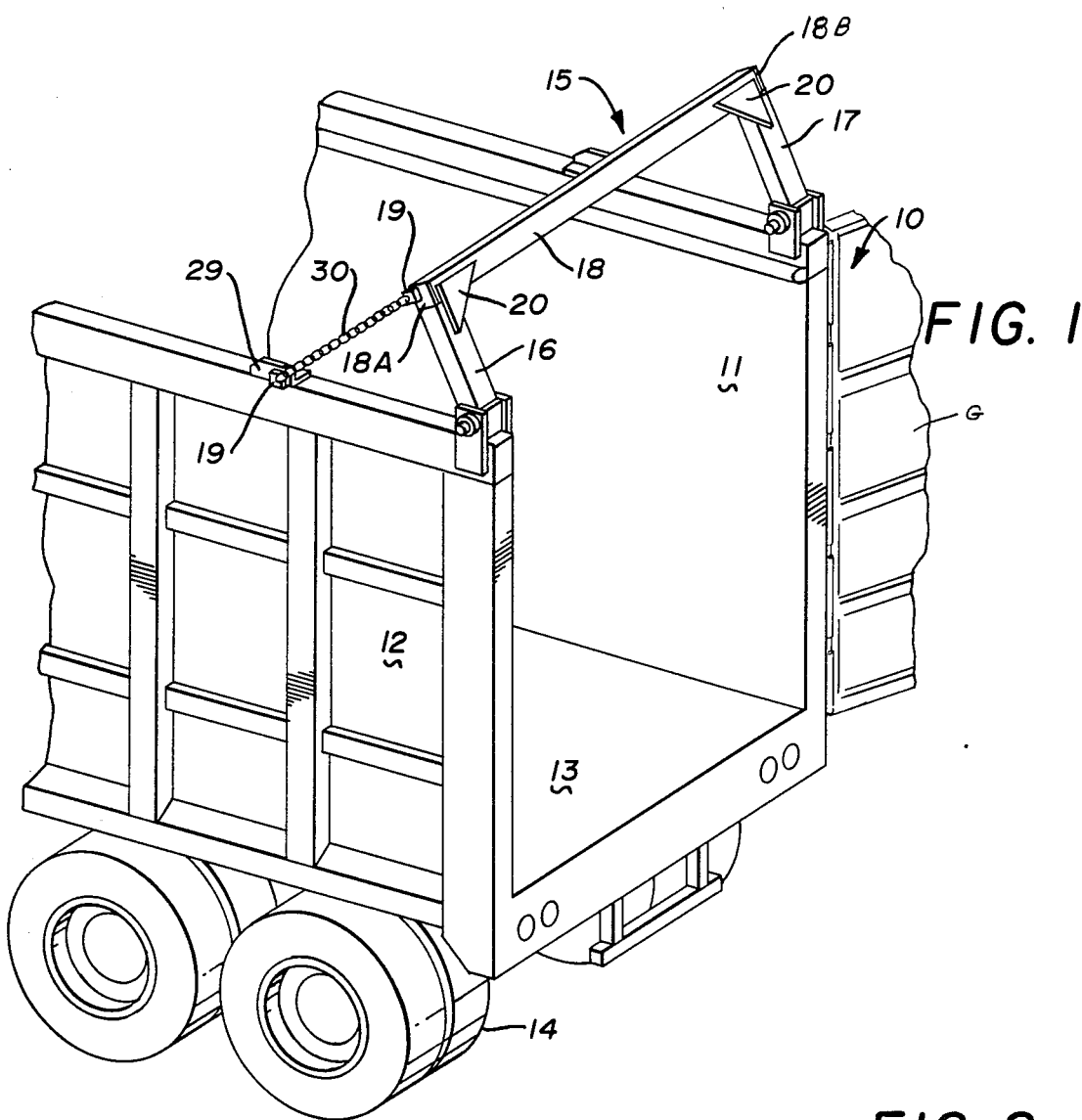
FIG. 1 is a perspective view of the end portion of a horizontal discharge trailer with a movable rear cross bar.
Figure 2:
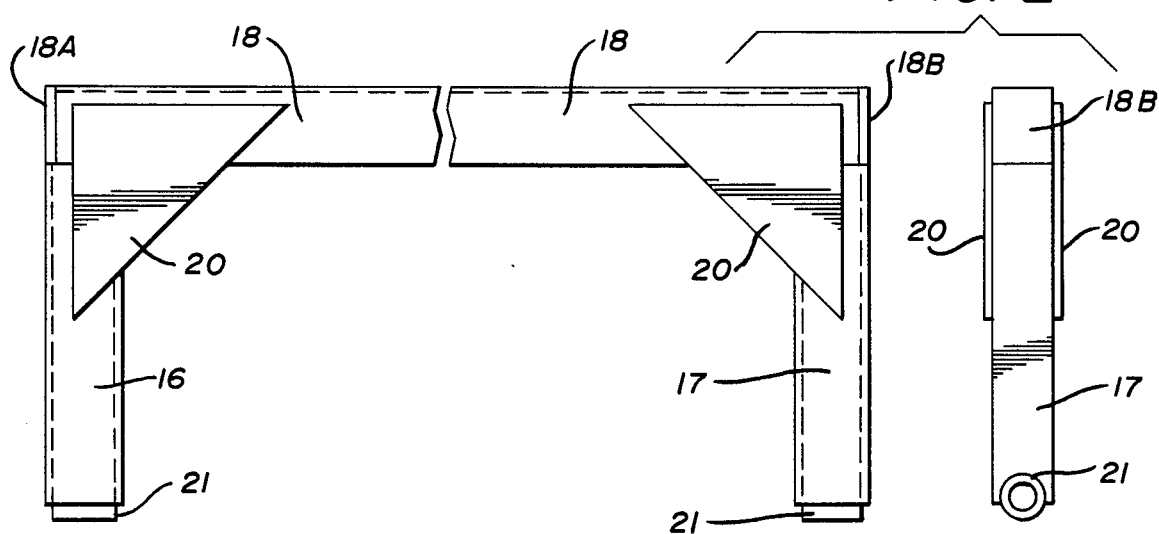
FIG. 2 is a side and end elevation of the movable rear cross bar.
Figure 3:
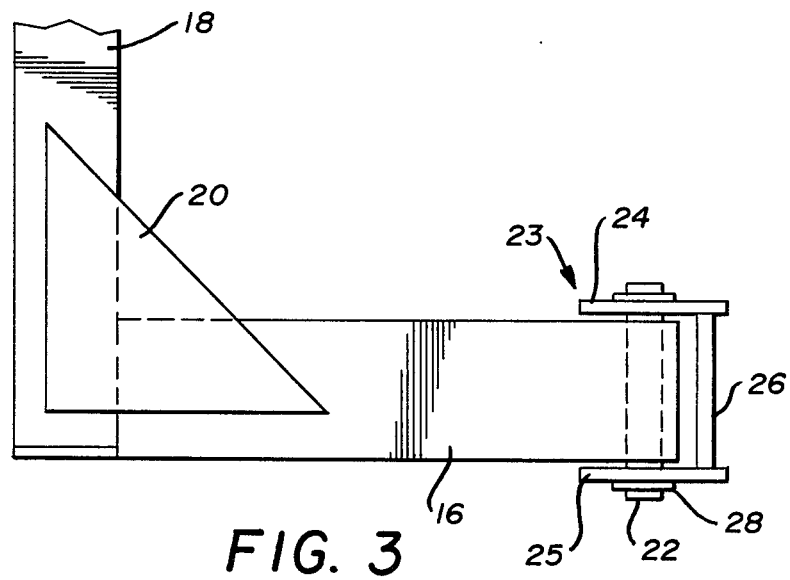
FIG. 3 is a side plan view of a portion of the rear cross bar.
Figure 4:
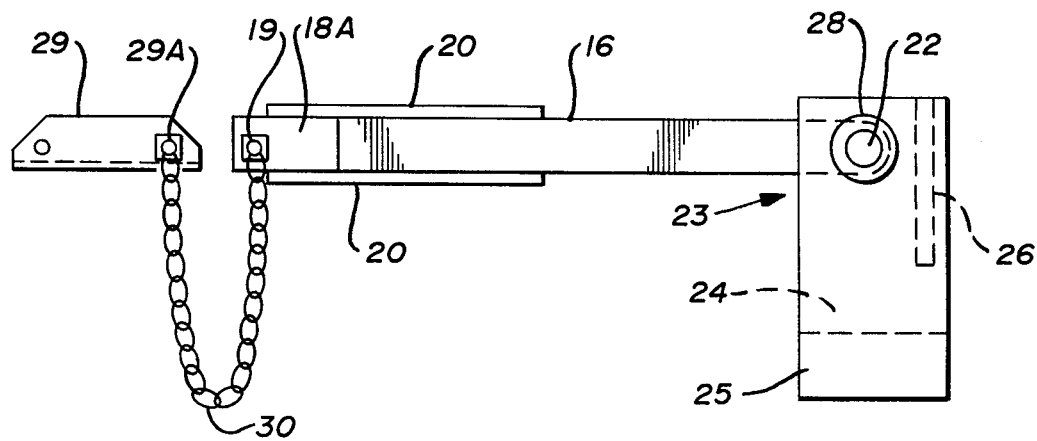
FIG. 4 is an end view of the movable rear cross bar and its associated restraint chain.

A rear portion of a trailer 10 can be seen in FIG. 1 of the drawings having side walls 11 and 12, a floor 13, a gate G, and wheels 14. A rear cross bar 15, as best seen in FIGS. 2, 3, and 4 of the drawings, comprises a pair or horizontally spaced vertically extending tubular members 16 and 17 pivotally secured to the side walls 11 and 12 and at their respective upper ends and horizontally disposed cross tubular member 18. The tubular member 18 has end plates 18A and 18B closing the same and has oppositely disposed chain lugs 19 secured on either end thereof as best seen in FIG. 4 of the drawings.

A pair of triangular gussets 20 are secured on of said upper ends of said tubular members 16 and 17 and said cross tubular member 18 reinforcing the same. A bushing 21 can be seen secured partially within the free lower ends of each of said tubular members 16 and 17 through which a pivot pin 22 passes. The pivot pin 22 is of an outer diameter less than that of the inner diameter of said bushing 21 allowing the same to move freely within.

Referring now to FIGS. 3 and 4 of the drawings, a pivot and support bracket 23 is composed of a pair of rectangular support plates 24 and 25 secured in spaced relation to one another by a cross plate 26 inwardly from their upper edges 27. The support bracket 23 has aligned apertures within adjacent their upper edges to receive the pivot pin 22 within the bushing 21. A washer assembly 28 secures the pin within the support bracket as will be well understood by one skilled in the art. The support brackets 23 are secured at the upper corners of the trailer side walls 11 and 12 as best seen in FIG. 1 of the drawings.

Referring now to FIGS. 1 and 2 of the drawings, a chain bracket 29 can be seen having a secondary chain lug 29A adjacent one end with a chain 30 extending between said chain lugs 29A and 19 effectively restraining the arcuate movement of said rear cross bar 15 to less than 80 degrees of vertical. This restriction of the arcuate movement of the movable rear cross bar assures the repositioning of the same to a horizontal position on the upper edges of the trailer side walls 11 and 12 after use.

During use, non-uniform waste material and the like within the trailer is ejected from the rear of the trailer by a ram, not shown. As the non-uniform waste material is pushed towards the rear of the trailer 10, the normal tendency is that small quantities pile up before the ram and are raised above the confines of the side walls 11 and 12 increasing the pressure on the side walls. The movable rear cross bar 15 reinforces the side walls against the imparted force and as the waste material engages the cross bar 15 it moves upwardly allowing additional clearance as the material passes by.

The movable cross bar 15 returns to its horizontal position once the trailer is fully unloaded or when no additional material engages the same. It can be seen that the chain 30 prevents the movable rear cross bar 15 from being dislodged by engagement of non-uniform waste material and also assures its return to the horizontal position on the upper edges of the side walls 11 and 12 will not effectively increase the overall height of the trailer which is critical in over-the-road use due to height limitations imposed by governmental regulations.

It will thus be seen that a new and novel movable cross bar device has been illustrated and described and that it will be apparent to one skilled in the art that various changes and modifications may be made therein without departing from the spirit of the invention and having thus described my invention, what I claim is:

1. A movable cross bar for holding the side walls of a horizontal discharge trailer in vertical position and providing increased clearance for material discharged comprising a pair of spaced members having a cross member secured therebetween, each of said spaced members being pivotally secured to one of said side walls of said trailer, restraint means on said cross member restricting the arcuate movement of said spaced members, means for reinforcing said cross member and said spaced members to one another.

2. The movable cross bar for use on a horizontal discharge trailer of claim 1 wherein said restraint means comprising a chain pivotally secured to said cross bar and a chain bracket secured to said trailers.

3. The movable cross bar for use on a horizontal discharge trailer of claim 1 wherein said means for reinforcing said cross member and said spaced members are a pair of oppositely disposed gussets.

4. The movable cross bar for use on a horizontal discharge trailer of claim 1 wherein said cross member and said spaced members are in right angular relation to one another.

* * * * *